United States Patent [19]

Melter

[11] Patent Number: 5,084,975
[45] Date of Patent: Feb. 4, 1992

[54] EXTENDABLE PRUNER

[75] Inventor: Craig H. Melter, Baraboo, Wis.

[73] Assignee: Fiskars Oy Ab, Helsinki, Finland

[21] Appl. No.: 726,317

[22] Filed: Jul. 5, 1991

[51] Int. Cl.⁵ .............................................. B26B 13/00
[52] U.S. Cl. ...................................... 30/249; 30/245
[58] Field of Search .................. 30/250, 248, 249, 245

[56] References Cited

U.S. PATENT DOCUMENTS

| | | | |
|---|---|---|---|
| 1,610,015 | 12/1926 | Kozma | 30/249 |
| 1,801,675 | 4/1931 | Maguire | 30/249 |
| 2,569,888 | 10/1951 | Gustafson | 30/249 |
| 2,744,322 | 5/1956 | Gustafson | 30/249 |
| 3,317,997 | 5/1967 | Hedstrom et al. | 30/248 |
| 3,360,858 | 1/1968 | Cowley | 30/249 |
| 3,594,903 | 7/1971 | Schluchter | 30/249 |
| 3,835,535 | 9/1974 | Robison et al. | 30/249 |
| 4,096,630 | 6/1978 | Honick | 30/258 |
| 4,224,739 | 9/1980 | Emblidge | 30/249 |
| 4,924,573 | 5/1990 | Huddleston et al. | 30/272.1 |

*Primary Examiner*—Mark Rosenbaum
*Assistant Examiner*—Hwei-Siu Payer
*Attorney, Agent, or Firm*—Foley & Lardner

[57] ABSTRACT

A portable extendable pruner for cutting limbs, branches and the like, the pruner including a hollow elongate housing assembly having a pair of telescoping tubular sections, a shears mounted on the outer end of one of the sections, an actuating element mounted on the outer end of the other of the sections, a first cable for connecting the actuating element to the shears, a second cable having one end connected to one of the tubular sections and the other end connected to the other of the tubular sections, and a compensating pulley assembly connecting the second cable to the first cable to maintain tension in the first cable when the tubular sections are moved axially relative to each other to adjust the length of the housing assembly.

12 Claims, 6 Drawing Sheets

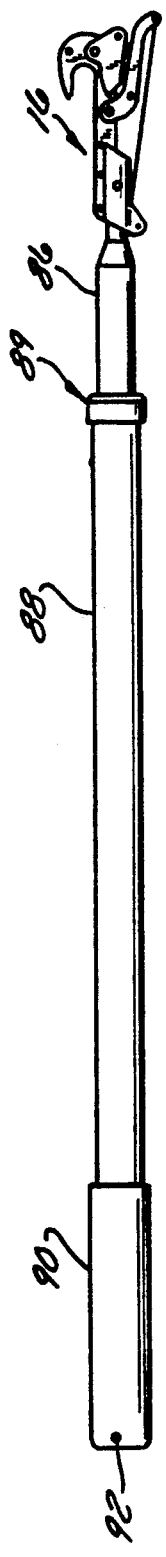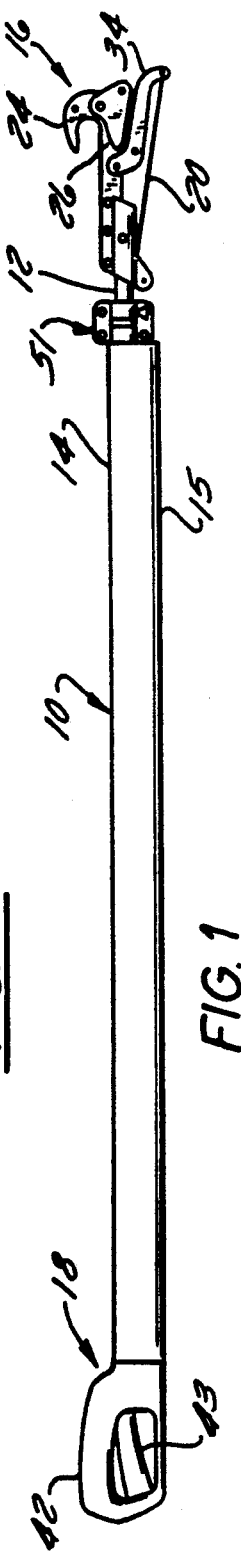

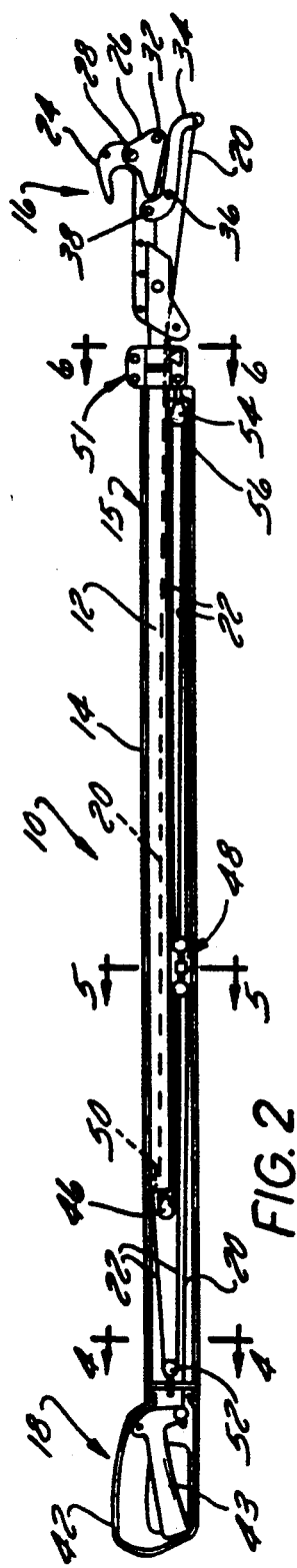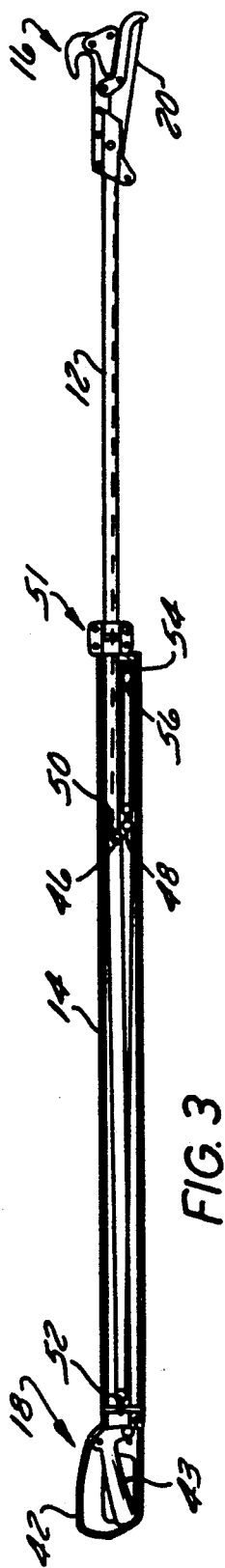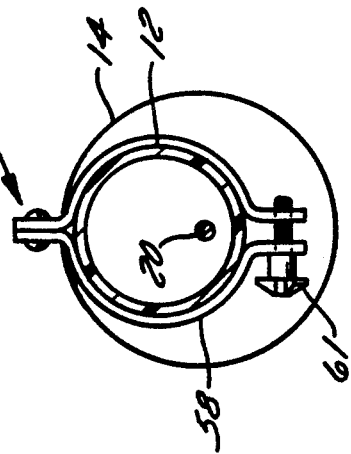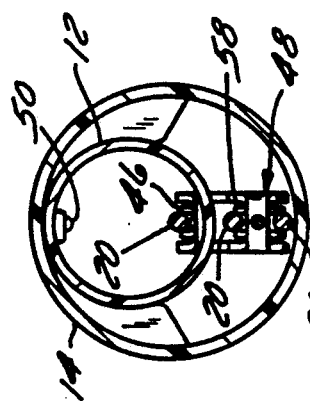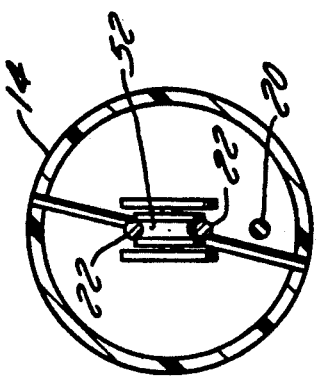

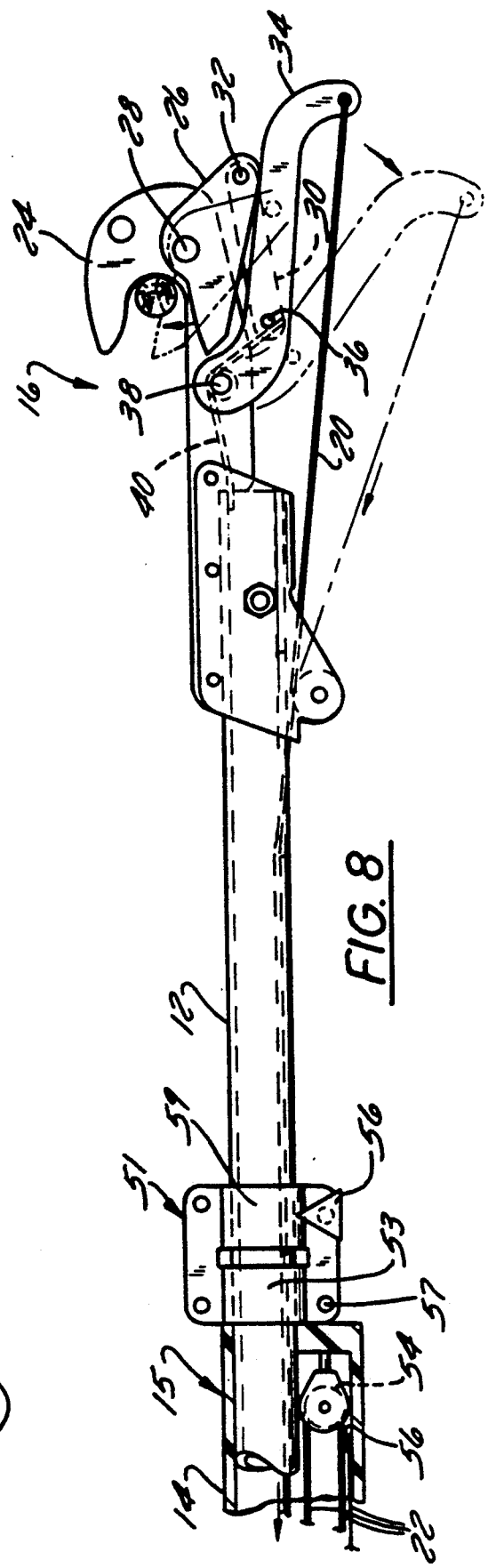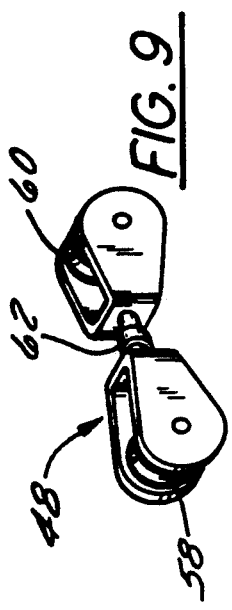

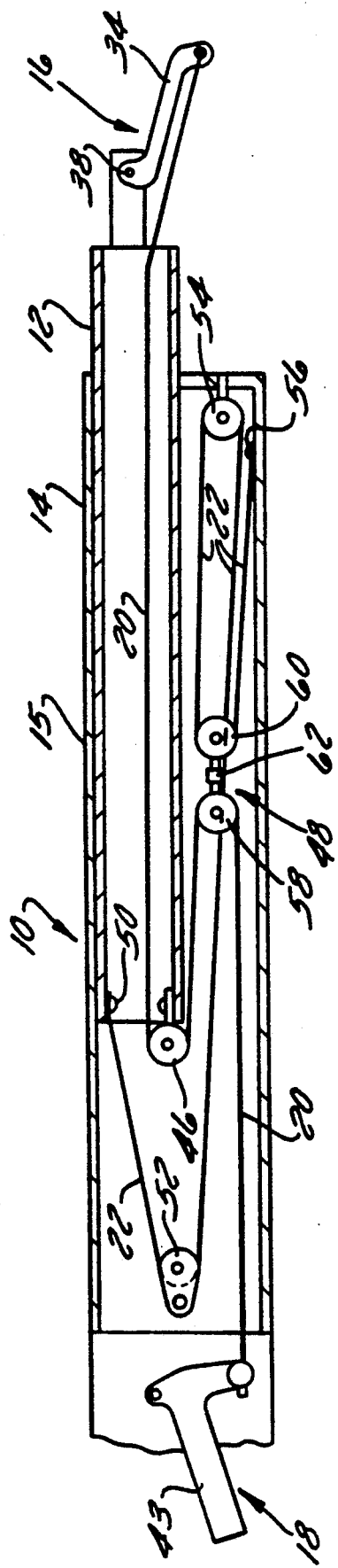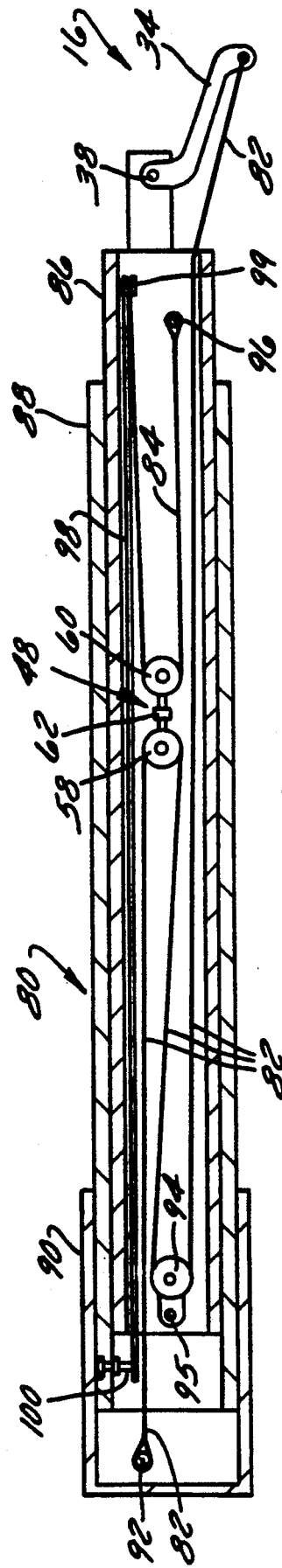

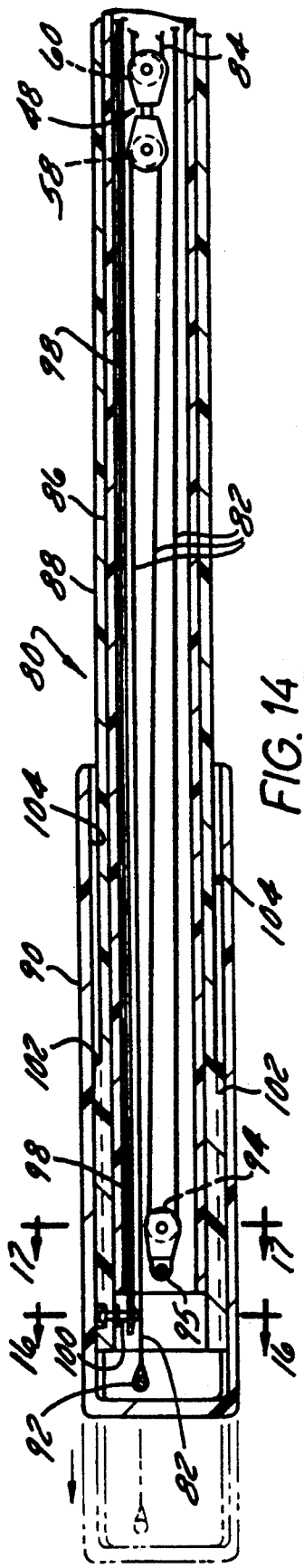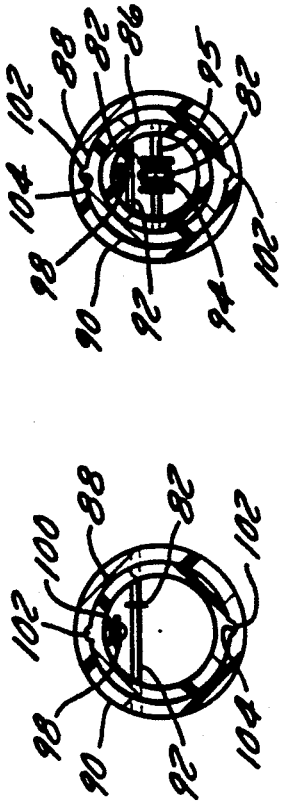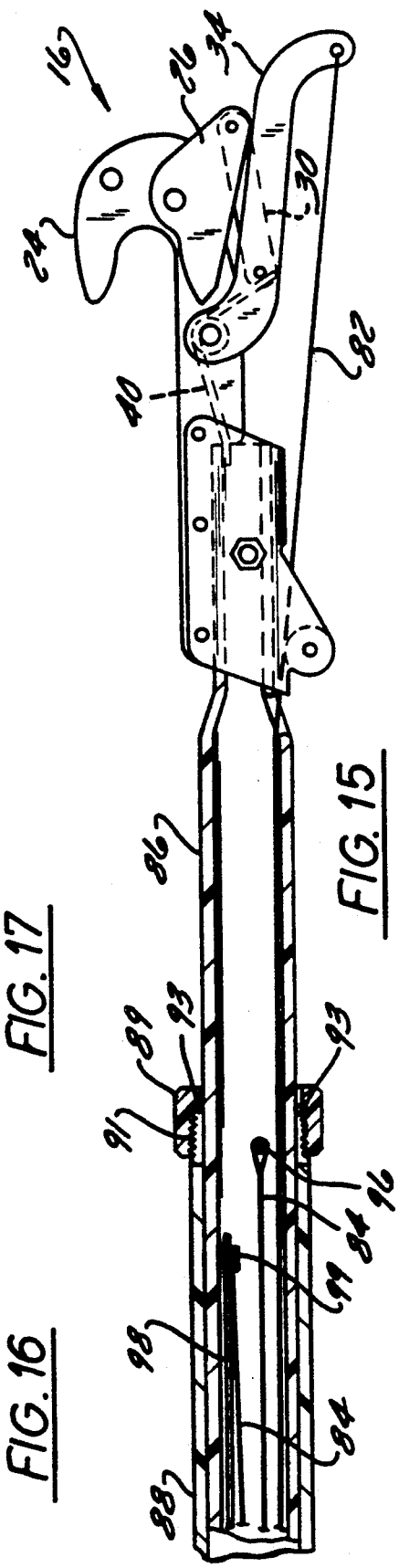

EXTENDABLE PRUNER

FIELD OF THE INVENTION

This invention relates to cutting tools, and more particularly to multi-purpose type pruning shears having an actuating rope or cable mounted in a telescopic handle which can be extended to greater heights while maintaining the cable taut between the cutting tool and the actuating handle.

BACKGROUND OF THE PRESENT INVENTION

Conventional tree and shrub pruners are typically provided with a pole of fixed length with a rope or cable mounted externally on the pole. The pruning shears are manipulated by holding the pole in one hand and the rope in the other hand in order to pull the rope and actuate the cutting tool. Pruning shears of this type usually require considerable dexterity and strength in order to accomplish even the most simple pruning jobs.

Pruners of this type are also not suitable to permit the remote cutting of trees and shrubs; that is, a ladder, stool or the like is frequently needed to permit the user to reach an otherwise inaccessible branch or limb. Consequently, a ladder or stool may provide an unsafe environment for the user, or necessitate the presence of another individual to lend assistance or provide support. In heavy shrubbery the rope often becomes entangled in the branches making it difficult to maneuver the pruning shears through the shrubbery.

SUMMARY OF THE INVENTION

The pruner according to the present invention is designed to provide easy access to limbs and trees normally not accessible by fixed handle devices. The pruner includes a pole formed by a pair of telescoping hollow tubes having a cutting head or shears attached to one end of one tube and an actuating handle at the other end of the other tube. The handle is connected to the shears by a cable or rope which is located inside of the tubes which form the pole for the pruner. In order to maintain tension in the cable a self-compensating assembly is provided in the pole to keep the rope or cable taut between the handle and the cutting head or shears so that the user can extend the pole to any length from a mini-travel position to maxi-travel position. The compensating assembly automatically adjusts the overlap and resultant end point distance of the cable or rope when the length of the pole assembly is changed. The actual length of the cable or rope is a constant.

One of the major advantages in providing a telescopic type pole for a pruner is the ability to house the rope or cable in the pole so that it does not get tangled with twigs, leaves or branches when used.

Another major advantage in the operation of the pruner is achieved by providing the trigger at one end of the pole to operate the cutting tool or shears of the pruner while holding the pole with both hands.

A further feature is provided by the use of a ratchet in combination with the trigger which increases the force capability of the cutting tool or shears by allowing for short strokes of the trigger to actuate and close the cutting tool or shears.

In one embodiment of the invention, the actuating cable and compensating cable are both centered in the inner tube of the pole thus advantageously providing a slimmer and lighter pole which is easier to manipulate in heavy shrubbery.

Other principal features and advantages of the invention will become apparent to those skilled in the art upon review of the following drawings, the detailed description and the appended claims.

DETAILED DESCRIPTION OF THE DRAWINGS

FIG. 1 is a side view of a trigger actuated extendable pruner according to the invention.

FIG. 2 is a cross section of the trigger actuated pruner in the mini-travel position.

FIG. 3 is a cross section of the trigger actuated pruner in the maxi-travel position.

FIG. 4 is a view taken on line 4—4 of FIG. 2.

FIG. 5 is a view taken on line 5—5 of FIG. 2.

FIG. 6 is a view taken on line 6—6 of FIG. 2.

FIG. 7 is an enlarged view of the trigger end of the pruner.

FIG. 8 is an enlarged view of the shear end of the pruner shown in FIG. 7.

FIG. 9 is a perspective view of the cable compensating assembly.

FIG. 10 is a schematic view of the cable system of the trigger actuated pruner.

FIG. 11 is a view of a handle actuated pruner according to the present invention.

FIG. 12 is a cross section view of the handle actuated pruner shown in the mini-travel position.

FIG. 13 is a cross section view of the handle actuated pruner shown in the maxi-travel position.

FIG. 14 is an enlarged view of the handle end of the handle actuated pruner.

FIG. 15 is an enlarged view of the shear assembly end of the handle actuated pruner shown in FIG. 14.

FIG. 16 is a view taken on line 16—16 of FIG. 14.

FIG. 17 is a view taken on line 17—17 of FIG. 14.

FIG. 18 is a schematic view of the cable system for the handle actuated pruner.

Figure 19:
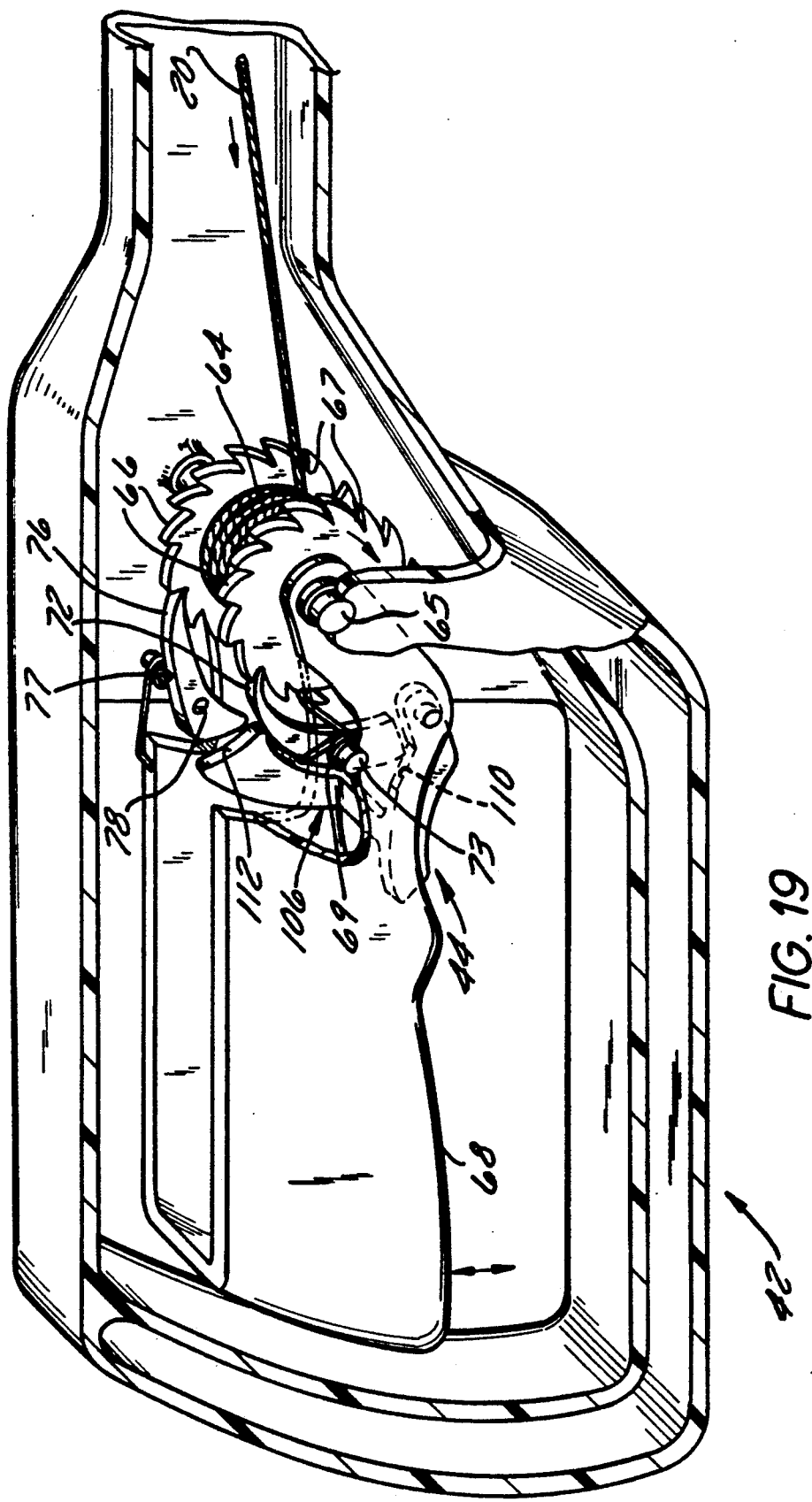
FIG. 19 is a perspective view of a ratchet type trigger assembly for the trigger type actuated pruner.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purposes of description and should not be regarded as limiting.

DETAILED DESCRIPTION OF THE PREFERRED EMBODIMENTS

The extendable pruner 10 as shown in FIGS. 1-10 includes housing assembly or pole 15 formed by a pair of telescoping tubes or sections 12 and 14. A cutting tool or shears 16 is mounted on one end of the inner tube 12 and a trigger assembly 18 is mounted on the end of outer tube 14. An actuating cable 20 is provided in the tubes 12 and 14 which is connected to the cutting tool or shears 16 and to the trigger assembly 18 to provide for actuation of the cutting tool 16 from the lower end of the outer tube 14. A compensating cable 22 is also provided in the tubes 12 and 14 and is connected to a compensating assembly 48 to maintain tension in the actuating cable 20 when the tubes 12 and 14 are extended or retracted.

The cutting tool 16 is of a fairly standard type including a hook 24 mounted on the end of the tube 12. A blade 26 is pivotally mounted on a pin 28 on the hook 24 for pivotal movement into the hook 24 for pruning branches. The blade 26 is pivoted by means of a link 30 which is connected to the blade by pin 32 and to a lever arm 34 by a pin 36. The lever arm 34 is pivotally mounted on the hook by a bolt 38. The lever arm 34 is biased by means of a coil spring 40 which is mounted on the pin 38 with one end extending through the pin 36 on the lever arm 34, and the other end anchored in the upper end of the inner tube 12. The lever arm 34 is actuated by squeezing the trigger assembly 18 to apply a pulling force to the cable 20 which pivots the lever arm 34 downward, producing a clockwise rotation of the blade 26 about the pin 28 into the hook 24.

The trigger assembly 18 includes a handle 42 mounted on the end of outer tube 14 and a trigger 43 mounted for pivotal movement in the handle 42. The trigger 43 is connected to the end of the cable 20 for actuating the lever arm 34. With this arrangement, the operator can use both hands to support the pole when actuating the trigger assembly 18. If the pruner 10 is to be used for heavy cutting of trees and shrubbery, a ratchet type trigger assembly 44 can be substituted for the trigger assembly 18 as shown in FIG. 19. In this regard and referring to FIG. 19, the trigger assembly 44 includes a spindle 65 mounted in the handle. A cable spool 64 is mounted for rotary motion on the spindle 65. A ratchet plate 66 is mounted on each end of the spool 64 and one end of cable 20 is wound on the spool. Each ratchet plate 66 includes a number of teeth 67. A trigger 68 is pivotally mounted on the spindle 65 for pivotal movement in handle 42. An advancing pawl 72 is pivotally mounted on a shaft 73 in the trigger 68 in a position to engage the teeth 67 on one of the ratchet plates 66. The pawl 72 is biased by a spring 69 into engagement with the teeth 67. A retainer pawl 76 is mounted on a pin 78 in handle 42 in a position to engage the teeth 67 in the other ratchet plate 66. A spring 77 is provided on pin 78 to bias the pawl into engagement with the teeth 67. In operation, the trigger 68 is squeezed against the handle 42 to move pawl 72 into engagement with the one of the teeth 67 to wind up the cable 20 to close the shears. On release of the trigger 68, the pawl 72 is withdrawn from the teeth 67 and the retainer pawl 76 prevents rotation of the spool 64.

The spool 64 is released from the advancing pawl 72 and retainer pawl 76 by means of a release assembly 106 mounted in trigger 68. The release assembly 106 includes a release trigger 108 pivotally mounted in the trigger 68. The trigger 108 includes a release cam 110 which is positioned to engage pawl 72 and a cam plate 112 positioned to engage retainer pawl 76. The pawls 72 and 77 are rotated away from the ratchet plates 66 when the release trigger 105 is squeezed into the trigger 68. The spring on the shears will pull the cable 20 to allow the cable to unwind from the spool 64.

The actuating cable 20 as seen in FIGS. 7, 8 and 10 has one end connected to lever arm 34 and the other end connected to the trigger 43 or ratchet assembly 44, as described above. The cable 20 extends from the lever arm 34 through the inner tube 12 and is passed around a pulley 46 mounted at the end of the tube 12. The cable 20 is then passed through compensating assembly 48 and connected to the trigger 43 or ratchet assembly 44.

The actuating cable 20 is maintained taut by the compensating cable 22 which has one end connected to the inner end of the inner tube 12 by an anchor 50. The cable 22 passes around a pulley 52 mounted on the outer end of the tube 14. The cable 22 is then looped around a pulley 54 mounted on the upper end of the outer tube 14 through the compensating mechanism 48 and is connected to the upper end of tube 14 by an anchor 56.

The compensating mechanism 48 includes a pair of pulleys 58 and 60 which are mounted on each end of a support member 62. When the inner tube 12 is pulled out of the outer tube 14 to extend the pruner, the anchor 50 will move with the inner tube 12, pulling the compensating cable 22 through the pulley 52. The end of the actuating cable 20 connected to the lever arm 34 will move the same distance as the anchor 50. The outward movement of the anchor 50 pulls the cable 22 around fixed pulley 52 and fixed pulley 54. The cable 20 passes through the pulley 60 in the compensating mechanism 48. Since the end of cable 22 is anchored at 56, the compensating assembly 48 will move in the same direction as the inner tube 12 but only half as far as the inner tube due to the loop in the cable 22 around pulleys 60 and 54. The pulley 58 in assembly 48 will pull the loop in cable 20 in the same direction to maintain tension in the cable 20 as the pole 15 is extended.

When the inner tube 12 is pushed into the outer tube 14, the pulley 46 will pull the cable 20 through pulley 58 in the compensating assembly 48 thereby moving the pulley 60 in the same direction to take up the slack in the compensating cable 22. The compensating assembly 48 again moves only half the distance of movement of the inner tube 12.

Means are provided for releasably locking the two pole sections 12 and 14 together when the pole has been extended to its desired length. Such means can be in the form of a double clamp 51. The lower section 53 of clamp 51 is clamped onto the end 55 of section 12 by means of a screw 57. The upper section 59 of clamp 51 is releasably secured to the inner section 12 of pole 15 by means of a hand screw 61. The pole 15 is extended or retracted by initially releasing hand screw 61. The inner section 12 is then pulled out of section 14 to the desired length. The hand screw is then reset to lock the inner section 12 in the outer section 14.

In the alternate embodiment of the invention, shown in FIG. 11–19, an extendable pole 80 is shown having an inner tube 86 and an outer tube 88 with the actuating cable 82 and compensating cable 84 centered in the inner tube 86. With this arrangement a slimmer and lighter pole 80 is thus provided which is easier to handle. The inner tube 86 is concentrically aligned in the outer tube 88. A tubular actuating handle 90 is mounted on the end of the outer tube 88 and the cutting tool or shears 16 is mounted on the end of the inner tube 86.

The inner tube 86 is locked to the outer tube 88 by means of a tapered threaded cap 89 mounted on a threaded section 91 provided on the end of outer tube 88. The threaded end is slotted at 93 and tapered slightly whereby the cap 89 will squeeze the threaded section 91 into tight engagement with the inner pole.

The actuating cable 82 is anchored to the handle 90 by an anchor pin 92 and to the lever arm 34 of the cutting tool or shears 16. Slack in the actuating cable 82 is eliminated by passing the actuating cable 82 around the pulley 58 on compensating assembly 48, around pulley 94 secured to the inner end of tube 86 by anchor pin 95. The other end of the cable 82 is connected to the lever arm 34. The compensating cable 84 is looped around pulley 60 on the compensating assembly 48 with one end of the cable 84 secured to the outer end of tube 86 by anchor pin 96. The other end of the cable 84 is connected to the end of a rod 98 in tube 86. The rod 98 is secured to the outer tube 88 by a pin 100. It should be noted that the rod 98 is an extension of the outer tube 88 which extends into the inner tube 86. When the inner tube 86 is pulled out of the outer tube 88 to extend the pole, the end of the compensating cable 84 connected to the inner tube 86 will be pulled outward pulling the compensating assembly 48 axially outwardly with the inner tube 86. At the same time the pulley 94 will move with the inner tube 86. The compensating assembly 48 will move one-half the distance of movement of tube 86 thereby maintaining tension in the cable 84.

When the inner tube 86 is collapsed into tube 88, the pulley 94 will pull the actuating cable 84 into the outer tube 88. The compensating assembly 48 will be pulled inward, as the distance between the handle 90 and shears 16 will get closer but the tension in the cable 84 will remain the same.

In this embodiment of the invention, the pruning shears is actuated by holding the pole 80 with one hand while pulling the handle 90 axially away from the shears 16 with the other hand. Means are provided for guiding the longitudinal motion of the handle 90. Such means is in the form of a pair of ribs 102 provided on the end of tube 88 which matingly engages grooves 104 in handle 90.

Thus, it should be apparent that there has been provided in accordance with the present invention an extendable pruner that fully satisfies the aims and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A portable extendable pruner for cutting limbs and branches, said pruner comprising:
   a hollow elongate housing assembly including a pair of telescoping tubular sections;
   a shears mounted on the outer end of one of said sections and an actuating means mounted on the outer end of the other of said sections;
   a first cable mounted in said housing assembly for connecting said actuating means to said shears;
   a second cable mounted in said housing assembly and having one end connected to said one of said sections and the other end connected to said other section; and a compensating pulley assembly connecting said second cable to said first cable for maintaining tension in said first cable when said sections are moved axially relative to each other to adjust the length of said housing assembly.

2. The pruner according to claim 1, including a first pulley mounted on the inner end of said one of said sections, said first cable being reaved around said first pulley and said compensating pulley assembly, a second pulley connected to said outer end of said other of said sections and a third pulley connected to the other end of said other of said sections, said second cable being reaved around said second and third pulleys and looped through said compensating pulley assembly whereby said compensating pulley assembly moves one-half the distance of movement of said first pulley when said one section is moved relative to said other section.

3. The pruner according to claim 2, wherein said compensating pulley assembly includes a support member and a pulley mounted on each end of said support member, said first cable being threaded around one of said pulleys on said compensating assembly and said second cable being threaded around said other of said pulleys on said compensating assembly.

4. The pruner according to claim 3 including means for locking said tubular sections together.

5. The pruner according to claim 1 wherein said actuating means comprises a handle and a trigger pivotally mounted in said handle and being connected to one end of said first cable for actuating said shears.

6. The pruner according to claim 5 wherein said actuating means includes a ratchet assembly connected to said first cable and actuated by said trigger.

7. The pruner according to claim 5 including a first pulley mounted on the inner end of said inner tubular section, said first cable extending from said actuating means through said compensating pulley assembly around said first pulley to said shears.

8. The pruner according to claim 7 wherein said outer tubular section includes a support rod having one end secured to said outer tubular section and the other end extending through said inner tubular section and said second cable has one end secured to said other end of said rod and the other end of said second cable connected to said outer end of said inner tubular section.

9. The pruner according to claim 1 wherein said actuating means comprises a tubular handle mounted for axial movement on one end of said other of said sections.

10. The pruner according to claim 1 wherein said tubular sections are concentrically aligned for axial movement relative to each other.

11. A portable extendable pruner for cutting limbs and branches, said pruner comprising a hollow elongate housing assembly including an outer tubular section and an inner tubular section coaxially aligned in said outer tubular section,
   a shears mounted on the outer end of said inner tubular section,
   a tubular actuating member mounted on the outer end of said outer tubular section,
   a first cable connecting said actuating member to said shears,
   a second cable connected to said inner tubular section and to said outer tubular section, and
   a compensating pulley assembly connecting said first cable to said second cable to maintain tension in said first cable when said inner tubular section is moved axially with respect to said outer tubular section.

12. The pruner according to claim 11 including a rod mounted in said housing assembly, said rod having one end connected to the outer end of said outer tubular section and the other end extending through said inner tubular section, said second cable having one end connected to the other end of said rod and the other end of said second cable connected to said inner tubular section.

* * * * *